United States Patent [19]
Lawton et al.

[11] Patent Number: 5,920,336
[45] Date of Patent: *Jul. 6, 1999

[54] BEAM DEFLECTING FOR RESOLUTION ENHANCEMENT AND BANDING REDUCTION IN A LASER PRINTER

[75] Inventors: Robert J. Lawton; Daniel R. Marshall, both of Boise, Id.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/528,488

[22] Filed: Sep. 12, 1995

[51] Int. Cl.$^6$ .......................................... B41J 2/47
[52] U.S. Cl. .................. 347/255; 347/239; 347/243; 347/260; 347/261
[58] Field of Search .................... 347/248, 249, 347/234, 235, 250, 129, 239, 243, 255, 260, 261

[56] References Cited

U.S. PATENT DOCUMENTS

| | | | |
|---|---|---|---|
| 3,573,449 | 4/1971 | Maloney | 364/822 |
| 3,653,067 | 3/1972 | Anderson et al. | 347/243 |
| 4,080,528 | 3/1978 | Kao et al. | 235/449 |
| 4,213,704 | 7/1980 | Burns et al. | 356/349 |
| 4,437,122 | 3/1984 | Walsh et al. | 348/625 |
| 4,761,662 | 8/1988 | Yoshimoto et al. | 347/248 |
| 4,847,641 | 7/1989 | Tung | 347/131 |
| 4,893,135 | 1/1990 | Jamzadeh | 347/248 |
| 4,989,941 | 2/1991 | Soref | 385/16 |
| 5,005,139 | 4/1991 | Tung | 395/101 |
| 5,083,140 | 1/1992 | Peterson et al. | 347/248 |
| 5,315,322 | 5/1994 | Bannai | 346/108 |
| 5,424,780 | 6/1995 | Cooper | 348/428 |
| 5,453,851 | 9/1995 | Faulhaber | 358/481 |
| 5,592,207 | 1/1997 | Kobayashi et al. | 347/129 |

FOREIGN PATENT DOCUMENTS

A4300739 6/1994 Germany.

Primary Examiner—N. Le
Assistant Examiner—Hai C. Pham
Attorney, Agent, or Firm—Lane Simmons

[57] ABSTRACT

A system and method of deflecting a laser beam in a laser printer for providing enhanced resolution and reduced banding effects. Specifically, to enhance resolution, the laser beam is borrowed (deflected) from a white space area adjacent an image to double resolution at the edges of the image. Similarly, banding is reduced by deflecting the beam to compensate for drum rotational and translational errors. The beam is deflected using an electro-optic modulator placed between the laser diode and the scanning mirror. Encoders detect drum rotational errors and motion between the optics unit and the drum to provide a closed loop feedback system for reducing banding.

27 Claims, 8 Drawing Sheets

BEAM DEFLECTING FOR RESOLUTION ENHANCEMENT AND BANDING REDUCTION IN A LASER PRINTER

FIELD OF THE INVENTION

This invention relates in general to image transfer technology and, more specifically, to increasing resolution and reducing banding in a laser printer.

BACKGROUND OF THE INVENTION

In the computing industry, laser printers have quickly become the standard for producing high quality, hard copy results. Image resolution is one of the characteristics that determines the quality of the printer output. For example, a 600 dot per inch (dpi) resolution laser printer has twice the resolution over a 300 dpi printer. Similarly, a 1200 dpi printer has twice the resolution over a 600 dpi printer. A "dot" or "spot" represents a laser pulse and is a basic building block for creating images in a laser printer. Essentially, a dot is an electrical charge imprint produced on a transfer medium by a laser diode for attracting toner in creating the image.

Generally, the more dots per inch, the better the resolution because the dots are closer together and thereby define sharper edges for the images produced. However, an increase in dpi usually increases a printer's base cost due to the added memory and improved hardware required to satisfy the increased dpi. Accordingly, the balancing of tradeoffs between cost and performance is an ongoing issue.

One conventional method of increasing a printer's resolution has been to pulse the laser diode more rapidly as the beam moves across the photoconductive drum in a conventional scan path. However, this method increases the dots per inch in the scan direction only. Although this method provides a relatively enhanced resolution, it does not provide resolution enhancement in both the x and y axis directions relative to the drum. Namely, more dots per inch are achieved in the scan direction but not in the process direction.

The development of gray scale technology has provided an alternate method for effectively increasing resolution. Gray scale selectively reduces the dot size in a printer to provide a better "fit" of the dots in an image. Dots are reduced from about 20% to 100% by controlling the pulse width modulation (PWM) of the laser diode. PWM is the modification of the duty cycle of the video (laser) signal wave form within a unit amount of time and has the apparent effect of changing the signal intensity. The duty cycle is the percent of time the signal is in an active state within the specified unit amount of time.

Although a 300 dpi gray scale printer provides one means for selectively increasing resolution over a 300 dpi binary (non gray scale) printer, it does not provide the enhanced resolution equal to a 600 dpi gray scale printer. Similarly, a 600 dpi gray scale printer does not provide an enhanced resolution equal to a 1200 dpi gray scale printer, and so forth. However, recent studies have shown that photo quality images are achievable at densities of 300 dpi gray scale. The use of 600 dpi, or greater, is required only where extremely sharp edges are required, such as in text or graphics. This suggests that a further solution (other than gray scale) for providing selectively increased resolution may satisfy many enhanced resolution printing needs.

Laser printers operate by scanning a laser beam horizontally across the photosensitive, electrically charged drum. If the laser beam is modulated, variations in charge will ultimately be translated to proportionate amounts of toner deposited on a sheet of paper (such as discussed with gray scale). However, since laser printers are designed to run very fast, this architecture has proven to be extremely sensitive to variations in drum speed. These variations appear on the printed page as increased or decreased spacing between lines and visually appear as "bands". This undesirable effect is called banding. Banding is a particularly severe problem for faster laser printers which are printing gray scale images, such as photographs. Research has shown that the most severe banding effect occurs at intermediate levels of gray.

The principle cause of banding is due to gear noise, although stepper motor frequencies and scanner frequency variations also contribute slightly to this problem. Gear noise results from imperfect spacing of gear teeth, variances in flexing of gear teeth as forces are transferred from one gear to the next, and other intrinsic variations in gear force transfer. The stepper motor contributes to banding because as it drives the gear array in a laser printer it may have slight variations in angular velocity due to the multiple magnet positions for each step. The scanner assembly includes a rotating multi-sided mirror, the laser diode, and associated optics.

Since new printer products are consistently designed to print faster, the problem of banding is likely to worsen. Conventionally, attempts at reducing banding effects have been focused on mechanical fixes related to gear noise, the stepper motor, and/or the scanner assembly. For example, mechanical fixes may involve gears with helical drive or gears made of better materials or with greater precision, but these generally add significantly more expense to the final product. Furthermore, these approaches do not address the root cause of the banding problem, that is, the open loop (no feedback) nature of how the drum is rotated. Namely, the drum is driven by a constant speed motor drive system, and no feedback from any source is used to modify the motor speed or to correct some of the previously mentioned contributions to banding.

Accordingly, given the forgoing backgrounds relating to printer resolutions and banding, objects of the present invention are to provide a new system and method for (1) increasing resolution in a laser printer without increasing the hardware and memory costs conventionally associated with enhanced resolution printers, and (2) reducing the visual impact of banding.

SUMMARY OF THE INVENTION

According to principles of the present invention in a preferred embodiment, a system and method of beam deflecting in a laser printer provide enhanced resolution and reduced banding effects. Specifically, to enhance resolution, the laser beam is borrowed (deflected) from a white space area adjacent an image to double the resolution at the edges of the image. Similarly, banding is reduced by deflecting the beam to compensate for drum rotational and translational errors.

The beam is deflected with a secondary optical beam deflector, such as an electro-optic modulator, placed between the laser diode and the scanning mirror (primary deflector). Position sensors detect drum rotational errors, motion between the optics unit and the drum, and corrections of the electro-optic modulator, to provide a closed loop feedback system for reducing banding.

Other objects, advantages, and capabilities of the present invention will become more apparent as the description proceeds.

DETAILED DESCRIPTION OF THE INVENTION

Figure 1:
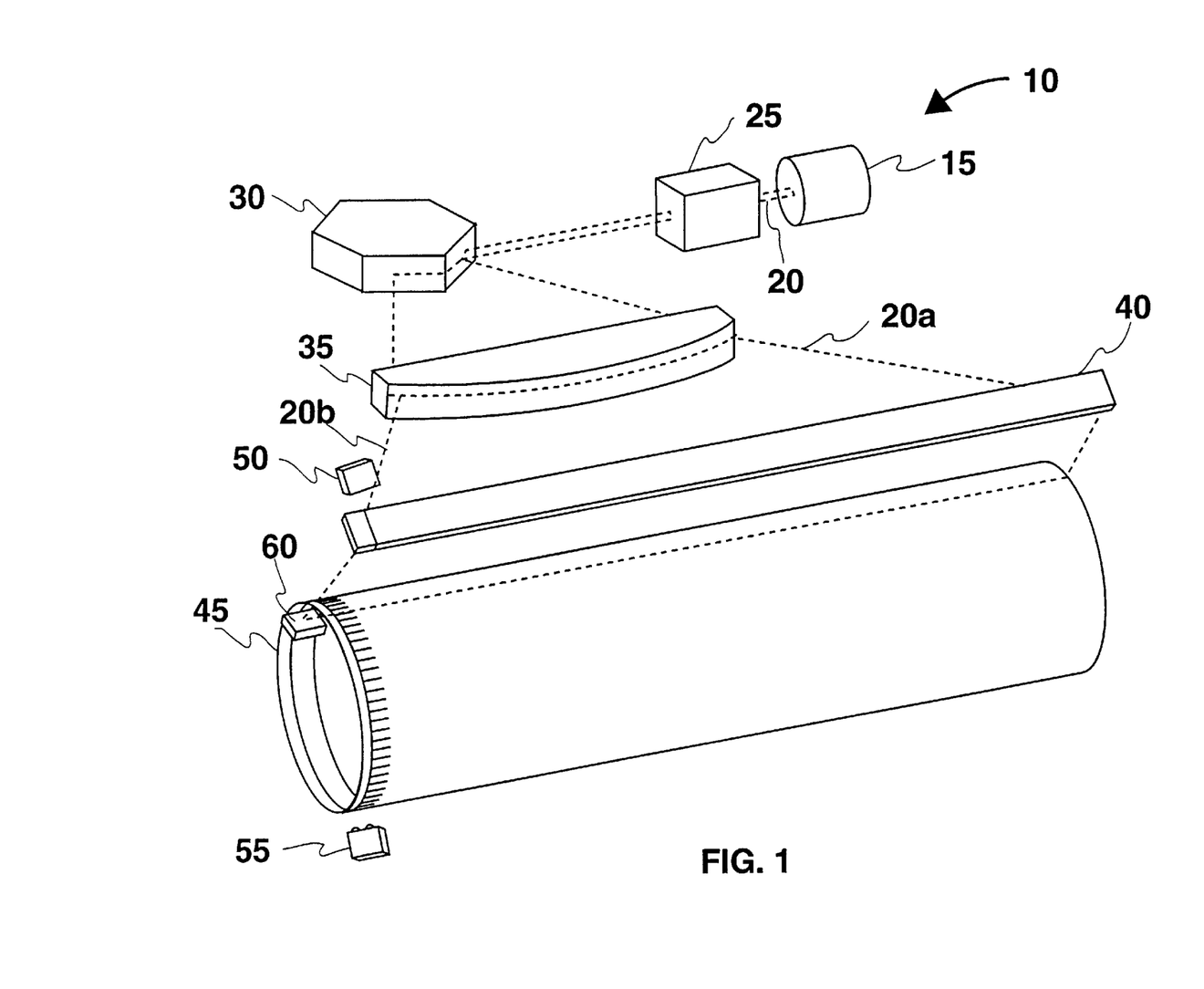
FIG. 1 is schematic block diagram of the present invention beam borrowing system for providing enhanced resolution and reduced banding effects in a laser printer.

FIG. 1 is schematic block diagram of the present invention beam borrowing system 10 for providing enhanced resolution and reduced banding effects in a laser printer. Laser diode 15 directs a laser beam 20 through secondary beam deflector (actuator) 25. Preferably, deflector 25 is a two axis deflector. Alternatively, two single axis deflectors (not shown) arranged orthogonally in the laser beam path could similarly be used. Deflector 25 provides the beam deflecting (bending/borrowing) capability necessary for the present invention.

Preferably, deflector 25 is located between laser 15 and polygon scanner (primary deflector) 30 in order to limit the aperture size required in the deflector. Such a beam deflector can in principle be mechanical in nature, operating for example by mechanically translating the diode laser relative to its collection lens, or by tilting a beam steering mirror. Preferably, however, deflector 25 is an electro-optic (EO) modulator well known in the art to provide the best combination of frequency, deflection angle range, efficiency and flexibility of operation. Furthermore, deflector 25 preferably includes both analog and digital channels—an analog channel for banding correction beam deflecting, and a digital channel for resolution enhancement beam borrowing. Modulator 25 is controlled by a flexible electrical function generator to maintain frequency and phase relationships between the deflection of the beam and the on-off modulation of laser 15.

Rotating scanning mirror 30 deflects the beam through lens 35 to scan a focused spot across folding mirror 40 and imaging surface (drum) 45. Beams 20a and 20b are both shown to demonstrate the endpoints of the path of beam 20 as it scans across drum 45 responsive to rotating scanning mirror 30. Although photoconductive drum 45 is shown, it will be obvious that other media of transfer, such as a continuous belt (not shown), could just as easily be used in place of drum 45.

Beam position detector (sensor/encoder) 50 senses the beam position in the scan direction, as conventional in the art, and is also used in the present invention to sense beam motion in the process direction to close the loop on intended positioning for beam deflecting by modulator 25. Namely, detector 50 sends a signal back to modulator 25 indicating a beam coordinate position for determination of where the beam is relative to where the beam should be detected, for subsequent deflection, if any, whether the deflection relates to resolution enhancement or banding correction.

The ability to deflect the beam provides for dynamically eliminating banding by simply adding a few detectors/encoders. Rotational error detector 55 detects rotational errors of drum 45 due to gear noise or other sources, and transmits a rotational positioning signal back to modulator 25 for banding correction purposes. Translational error detector 60 detects motion between the optics unit and drum 45, and transmits a translational positioning signal back to modulator 25, also for banding correction purposes.

Deflector 25 offers two mechanisms for the correction of periodic and impulsive banding: (1) because spot placement is affected by the phase (timing) of the laser modulation relative to a cross-track (cross-scan) dithering motion created by driving the deflector with a suitable waveform, the position of the spot may be varied by advancing or retarding the phase of the laser modulation relative to the phase of the x-y axis deflector, subject to limitations imposed by the particular trajectory chosen; and (2) because the beam deflector has DC to approximately 100 Mhz response, a slowly varying bias term may be added to the basic modulation frequency for x-y banding correction. Drum position detectors 55 and 60 provide appropriate positioning information, and beam position detector 50 provides closed-loop control for exact beam placement.

Figure 2:
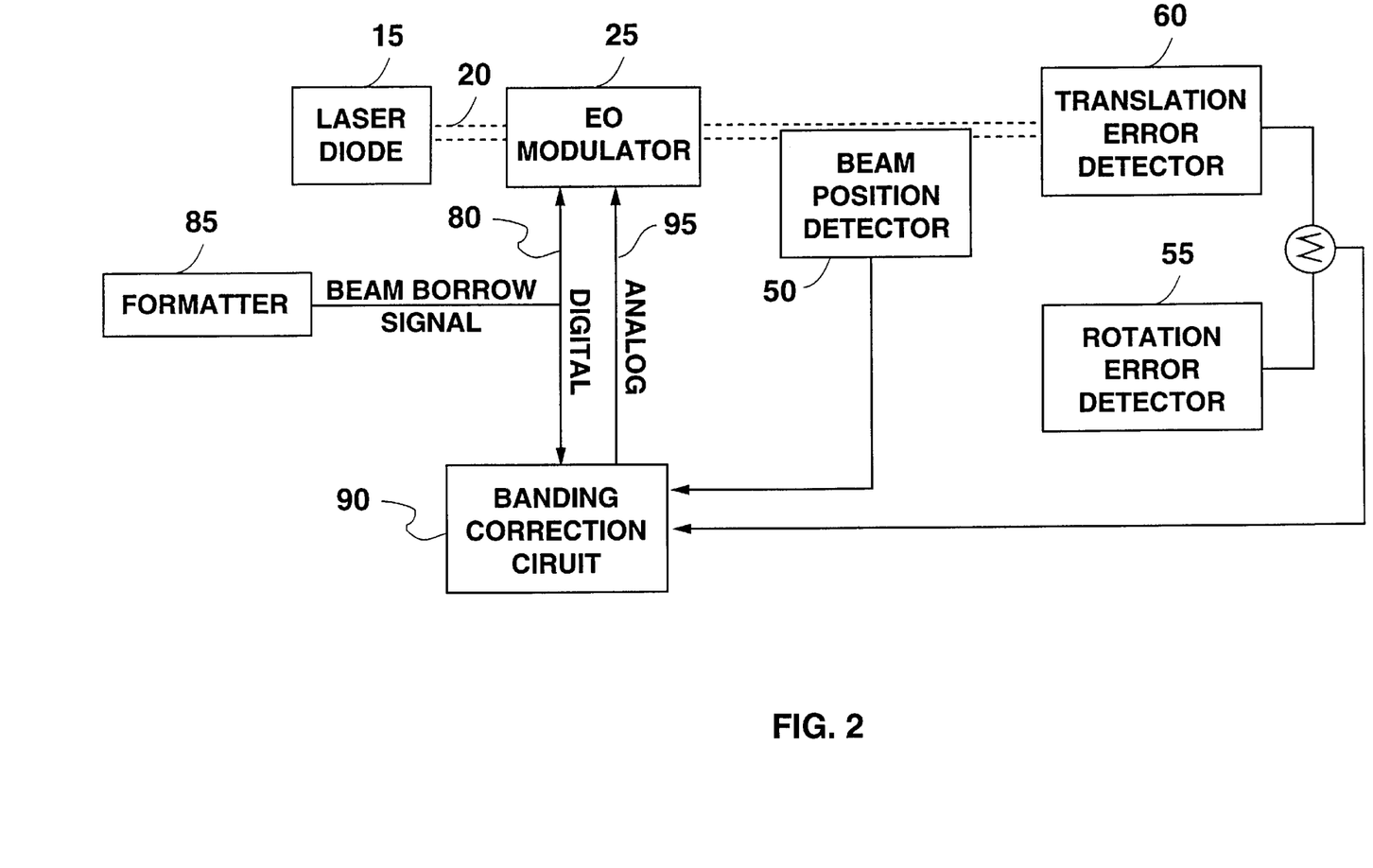
FIG. 2 is a schematic control block diagram showing signal paths of the present invention.

Referring now to FIG. 2, a schematic control block diagram shows signal paths of the present invention. Like components retain like references throughout the Figures.

Laser diode 15 is shown transmitting beam 20 through EO modulator 25, to beam position detector 50, and to translation error detector 60. Modulator 25 and banding correction circuit 90 each receive beam borrowing digital signal 80 from print formatter 85. Modulator 25 also receives an analog signal 95 from banding correction circuit 90.

Banding correction circuit 90 receives position signals from beam position detector 50, rotation error detector 55, and translation error detector 60. Feedback from the rotational and translational error detectors is summed and used to drive the analog channel of the EO modulator for banding reduction. As a result, the beam is advanced or retarded based on drum position.

Some of the benefits of the present invention system 10 for enhanced scanning techniques includes:

micropositioning of dots at writing speed in the process direction;

improved print quality;

improved design flexibility in trading off resolution, speed, and cost;

reduced memory requirements;

better price/performance ratios;

correction of banding errors without making fine mechanical corrections to the drum position; and, higher printing speeds without increased polygon motor speed.

Figure 3:
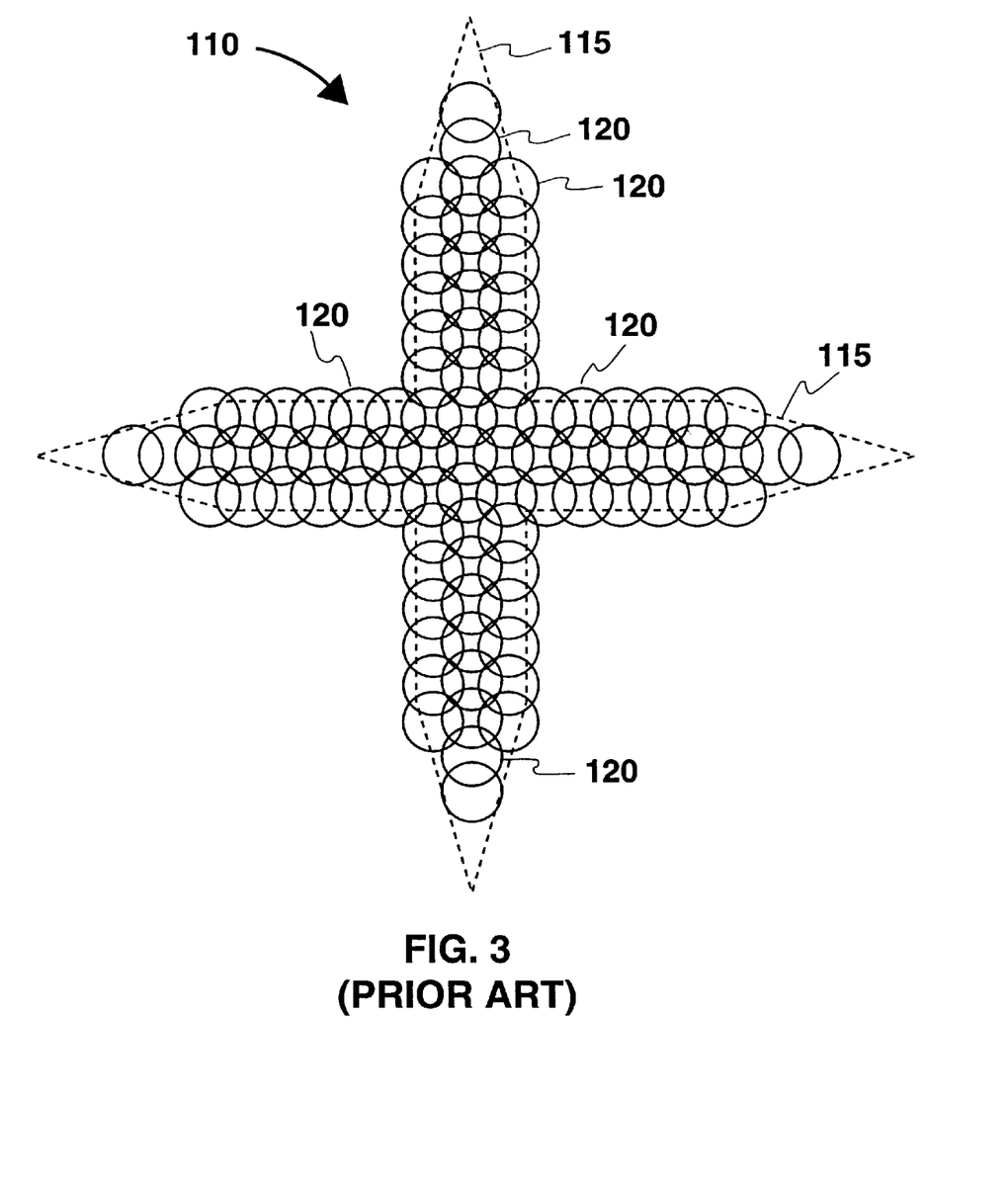
FIG. 3 is a magnified wingding "pplus" symbol at conventional 300 dpi binary.
Figure 4:
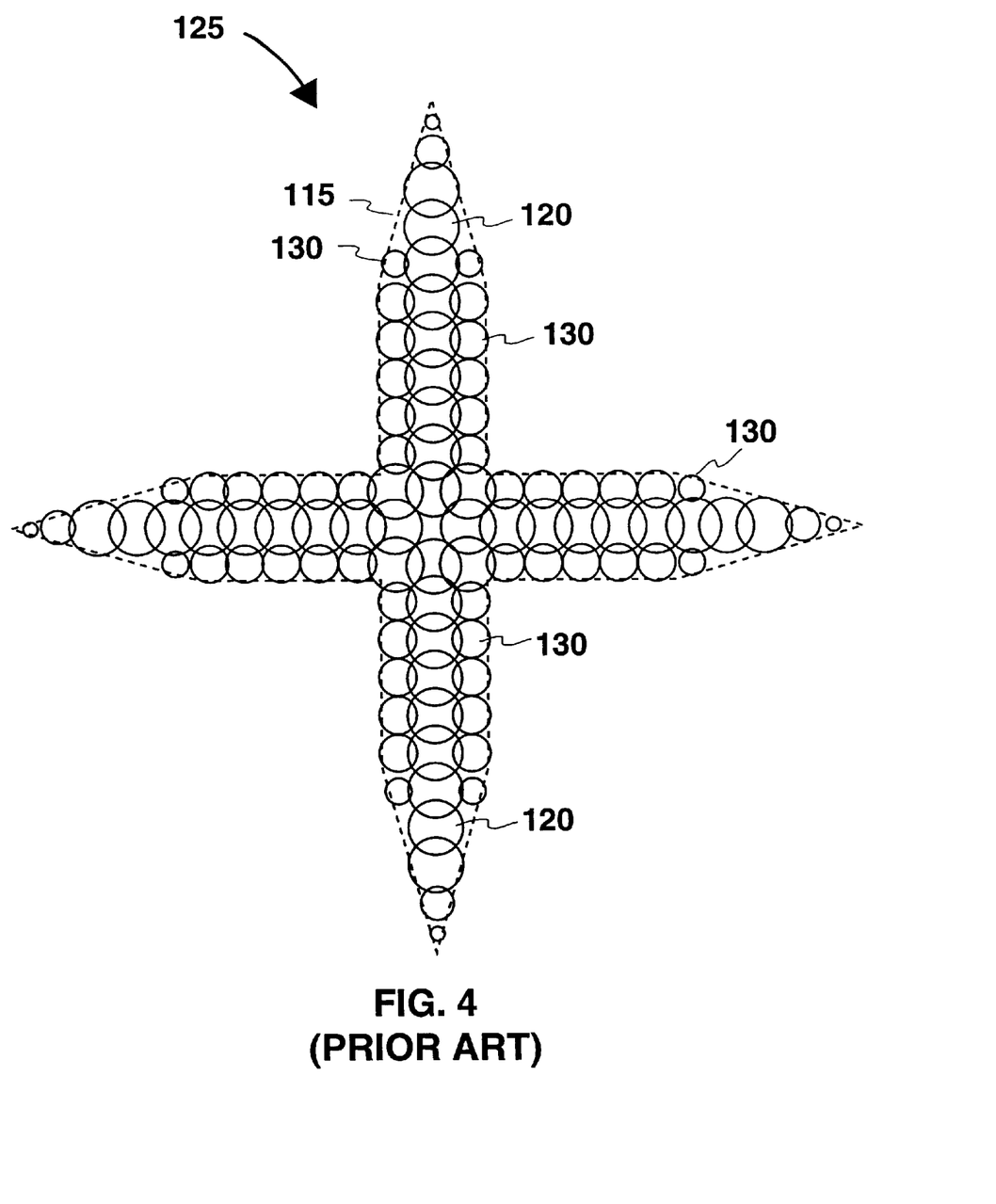
FIG. 4 is a magnified wingding "pplus" symbol at conventional 300 dpi gray scale.
Figure 5:
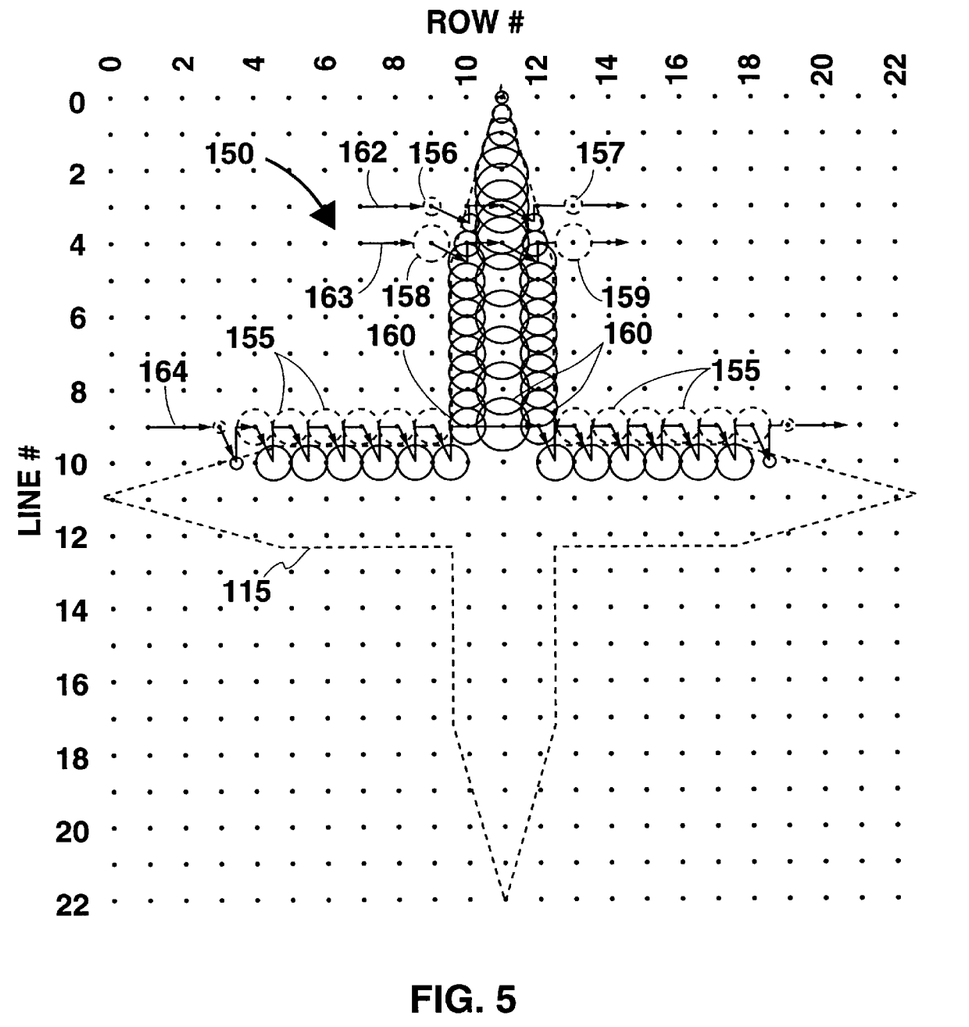
FIG. 5 is a magnified wingding "pplus" symbol at 300 dpi gray scale, and showing the beam borrowing method of the present invention.
Figure 6:
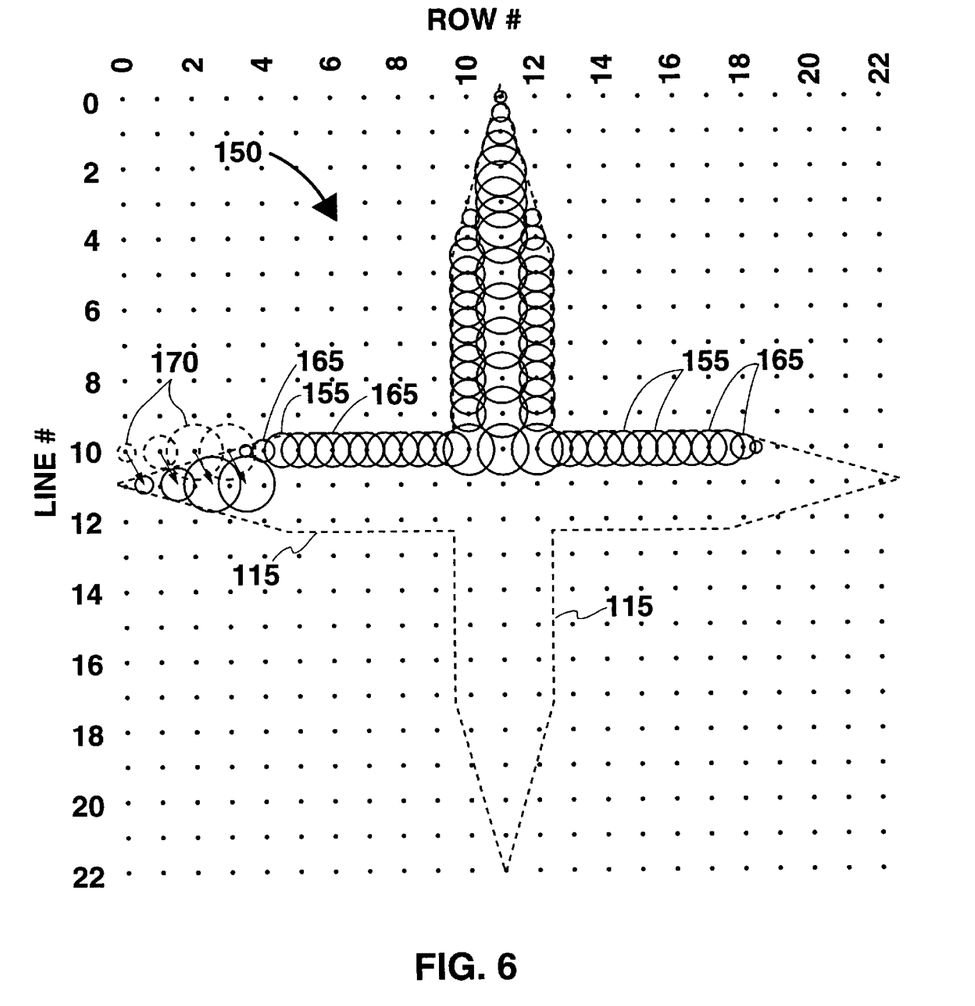
FIG. 6 is a magnified wingding "pplus" symbol at 300 dpi gray scale, further showing beam borrowing of the present invention.
Figure 7:
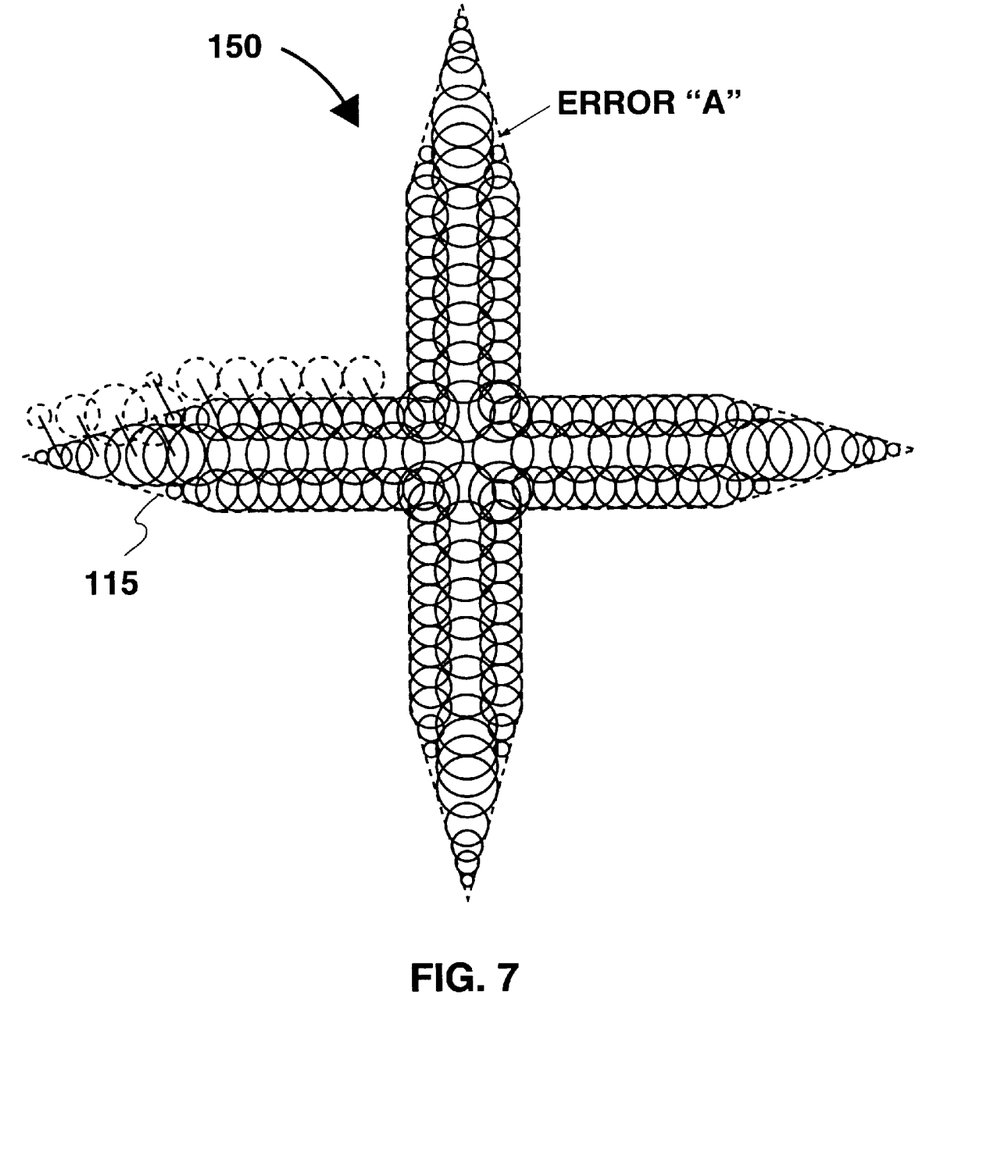
FIG. 7 is a magnified wingding "pplus" symbol at 300 dpi gray scale and completely imaged using beam borrowing of the present invention.
Figure 8:
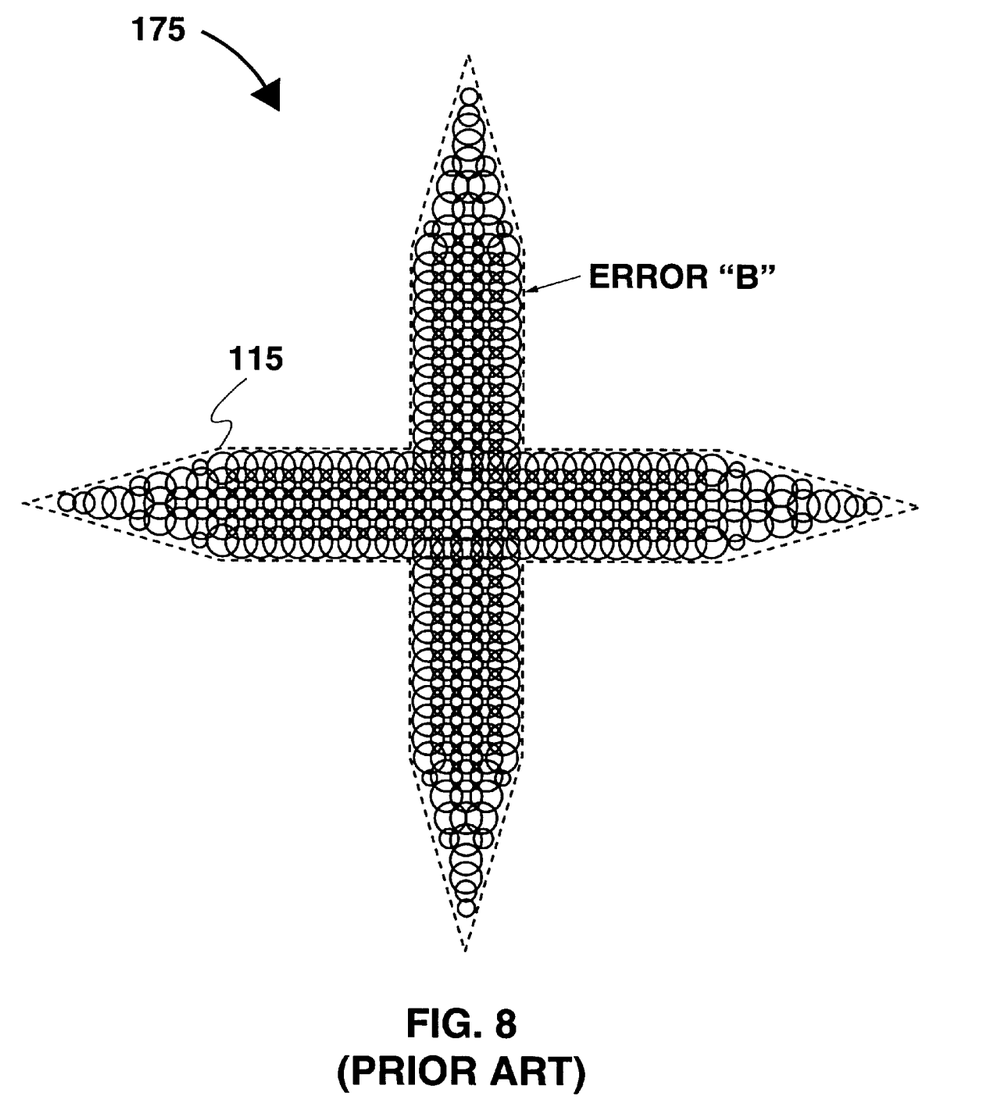
FIG. 8 is a magnified wingding "pplus" symbol at conventional 600 dpi gray scale.

FIGS. 3, 4 and 8 represent variations of a magnified wingding "pplus" for demonstrating conventional imaging technology and for comparison with FIGS. 5–7 which demonstrate the beam deflecting ("borrowing") imaging method of the present invention. The wingding "pplus" is used for a combination of horizontal, vertical, and low angle lines as well as for ease of illustration. The Figures demonstrate the relative ability of each technology to position photons (dots) on a photoconductive drum. Dot diameter represents laser pulse width/power. Variations in the dot diameters represent gray scale levels. Furthermore, as is well understood in electrophotographic art, the dots are not actually round as depicted, nor do they develop as such. However, the ability to accurately position the beam for placement of the dots is directly related to final image quality.

Referring now to FIG. 3, a wingding "pplus" symbol 110 is shown, at 100× magnification, demonstrating conventional 300 dpi binary output. Dashed lines 115 show the desired pattern for "pplus" symbol 110. Each dot 120 represents a laser pulse to which toner is attracted (only a few dots are reference labeled). Dots 1 20 fill in desired pattern 115 and form the "pplus" symbol as actually printed. The 100× magnification clearly shows why the point of the "pplus" is not pointed using conventional 300 dpi binary technology. It is also clear how dots 120 overlap desired pattern 115, creating a slight margin of error relative to desired patter 115 and thereby forming a slightly off-sized image.

FIG. 4 is a wingding "pplus" symbol 125 at 100× magnification, showing conventional 300 dpi technology in combination with gray scale. Desired shape 115 is the same as in FIG. 3. Dots 120 represent a conventionally sized 300 dpi dot similar to those shown in FIG. 3. Dots 130 represent gray scale (reduced size) dots. As is obvious from the drawing, gray scale provides an improved image over conventional imaging. Namely, the points of the "pplus" are better defined and the edges are more accurately defined, relative to desired shape 115, because of the ability to selectively reduce the size of the dots.

FIGS. 5 and 6 are a wingding "pplus" symbol 150 partially imaged at 100× magnification, showing conventional 300 dpi technology and gray scale in combination with the novel beam borrowing method of the present invention. The grid is shown for visual clarification in identifying the imaging steps for the "pplus" symbol, and also for identifying base resolution, i.e., the locations where a dot could be placed using conventional base 300 dpi technology. For description purposes, the y axis grid lines (labeled "lines") represent the image process direction (i.e., photoconductive drum roll direction or movement of the paper being printed), and the x axis grid lines (labeled "row") represent the scan direction (i.e., conventional movement of the laser beam across the length of the drum).

Beam borrowing of the present invention enhances edge definition of characters and images in each color plane by "borrowing the beam" from adjacent white space where the beam is not needed (during normal scanning) and applying it to where it is needed at the edge of an image (since it's in the "neighborhood" anyway). The beam is borrowed by deflecting it with an electro-optic modulator (see FIG. 1) placed between the laser diode and the scanner. The beam is deflected from a given scan line to an offset position or positions relative to the scan direction and/or the processing direction and then, optionally, returned to its normal scan course.

An edge is defined as the boundary between an area of color and white space, or in other words, between an area that is charged to attract toner and an area that does not attract toner. Beam borrowing takes advantage of the adjacent white space by borrowing the beam from its normal scan course and using it to produce 2× the base printer dot resolution at the edges of the image. For example, FIGS. 5–7 demonstrate how the edges of the "pplus" symbol are enhanced (doubled) from 300 dpi gray scale resolution to 600 dpi resolution using beam borrowing and gray scale. The Figures also show how dots can be positioned in both process and scan directions for resolution doubling at the edges.

In a preferred embodiment of the present invention, white space is detected or recognized adjacent an image edge by referencing a stored memory map of the image. As conventional in the art, the memory map identifies the dot locations defining the image and, similarly, white space locations. However, it is obvious that other methods of white space detection may likewise be used.

FIG. 5 shows the printing of lines zero (0) through nine (9) of "pplus" 150, although for clarity of depiction, only lines 3, 4, and 9 are drawn showing exemplary scan paths and "borrowed" dots.

As the laser beam scans the drum at line 3 (the current scan line) in the scan direction, one embodiment of the directional path (trajectory) of the beam is shown at 162. During scanning of line 3, row 9 is detected (via the memory map) as being a white space adjacent a left edge of the vertical arm of "pplus" 150. Accordingly, the beam is borrowed and offset one row over and one half line down so that dot 156 is placed at offset position row 10 and mid way between scan lines 3 and 4. Subsequently, the beam returns to its projected path to continue scanning line 3, and a conventional dot is placed at its native position at row 11, line 3. The conventional scan path of the laser beam along a scan line is considered here the projected path. Any deflection of the beam from that projected path constitutes a deflection to an offset position.

Also upon reaching row 11, line 3, a white space adjacent the right edge of the vertical arm of "pplus" 150 is detected (the white space being detected at row 12, line 3). Accordingly, the beam is once again borrowed and offset one row over and one half line down so that dot 157 is placed at row 12 and mid way between scan lines 3 and 4. Subsequently, the beam returns to its projected path to continue scanning line 3.

After line 3 is scanned, line 4 is similarly scanned along path 163. Dots 158 and 159 of line 4 are borrowed, when their respective white spaces are detected, and placed one row over and one half line down.

Without further repetitive description, it is noted that the complete vertical left and right edges (rows 10 and 12) of the top vertical arm of "pplus" 150, and the point (row 11), were imaged using this beam borrowing method. Namely, since each of these dots are printed at one half line offset, they provide the basis for forming a double density (600 dpi in this example) left and right edge and point of the top arm of "pplus" 150.

With respect to scanning of line 9, shown at scan path 164, dots 155 at rows three through nine (3–9) and thirteen through nineteen (13–19) are not needed because they are white space with respect to the desired image 115 of "pplus" 150. However, they are adjacent to the top edge of the left and right arms of "pplus" 150 and are therefore printed one line down and one half row over by "borrowing" the beam during the scan of line nine. Phantom dots 155 at rows 3–9 on line nine (not all are labeled), and the arrows pointing from each phantom dot to line 10, represent how these dots are "borrowed". Due to the depiction of scan path 164, it is more difficult to see how phantom dots 155 at rows 13–19 are borrowed. However, each of these dots is borrowed, effectively, one line down and one row over to the left, rather than to the right, as occurred in dots 155 at rows 3–9. Since all these dots 155 are printed at one half row offset on line 10 they provide the basis for forming a double density (600 dpi in this example) top edge along the left and right arms of "pplus" 150. Dots 160 at rows ten through twelve (10–12) of line nine are printed in their native positions, as conventionally occurs, to form the base of the top arm of "pplus" 150.

FIG. 6 shows the printing of line ten. Dots 165 at rows four through eighteen are printed in their native positions. The resultant effect is each dot 165 overlaps with each "borrowed" dot 155 that was previously printed on line ten during the scanning of line nine. This combination of borrowed dots 155 from line nine plus native dots 165 from line ten produce 600 dpi resolution at the edge, where it is needed.

As line ten is printed, dots 170 at rows one through four (1–4) and nineteen through twenty-two (19–22) are not needed because they are white space with respect to the desired image 115 of "pplus" 150. However, they are detected as being adjacent to the edge of the left and right points of "pplus" 150 and are therefore borrowed by line eleven, i.e., offset printed one line down and one half row over during the scan of line 10. Phantom dots 170 on line ten, and the arrows pointing from each phantom dot to line 11, represent how the dots are "borrowed".

As shown in FIGS. 5 and 6, in either case for beam borrowing (scan direction or process direction), the present invention method shifts the dots appropriately to effectively double the resolution at the edge of the image being printed. Furthermore, as previously mentioned, this borrowing occurs using the beam bending capability of modulator 25 (see FIG. 1), or similar deflection device.

FIG. 7 is a magnified wingding "pplus" symbol 150 at 300 dpi gray scale, and completely imaged using beam borrowing of the present invention. It is obvious that beam borrowing produces a significantly improved image over conventional technology (compare to FIG. 4 showing 300 dpi gray scale without beam borrowing). It is also obvious that beam borrowing produces an image quality similar to that produced by conventional imaging technology of double the resolution. For example, FIG. 8 is a magnified wingding "pplus" symbol 175 at conventional 600 dpi gray scale, and represents a 2× resolution over the base 300 dpi of FIG. 7 (and also FIG. 4). Although neither technique is capable of rendering the desired pattern 115 perfectly, they are each quite similar in final output quality. Specifically, the imperfection shown as Error "A" on FIG. 7, using 300 dpi, gray scale, and beam borrowing, displays how angled lines are not rendered as accurately relative to desired pattern 115. In contrast, the imperfection shown as Error "B" of FIG. 8, using conventional 600 dpi and gray scale, displays how horizontal and vertical lines are not exactly matched relative to desired pattern 115.

Although the discussion has been focused on 300 dpi and 600 dpi technology, this has been for exemplary purposes only. In other words, beam borrowing of the present invention is just as equally applicable to other dpi technologies, such as 1200 dpi.

Furthermore, in the simplest scheme of the present invention, borrowed dots are moved, effectively, in an "L" pattern, similar to the knight in chess. For beam borrowing, the base of the "L" is ½ row/line and the height is one full row/line, depending on the scan/process direction (see the borrowed dots of FIGS. 5 and 6). This results in a total of nine possible positions for each dot (including the conventional dot x-y location). Hence, only three bits of additional memory are required to define direction, with four bits being the maximum needed. Therefore, the ratio of memory required for beam borrowing (BB) relative to conventional technology is:

$$\begin{aligned}\text{Memory Reduction} &= \text{Memory for Beam Borrowing}/\\ &\quad \text{Memory for full } 2X \text{ resolution}\\ &= lpi\ [4\text{ bits (gray)} + 4\text{ bits }(BB\text{ positon})]/\\ &\quad [(2*lpi)^2]*(4\text{ bits gray})\\ &= .5\text{ memory reduction ratio}\end{aligned}$$

where lpi=lines per inch.

As well known in the art, lines per inch (lpi) equates to dots per inch (dpi) in certain cases, but may be distinguished in other cases depending on graying techniques used. Furthermore, it should be noted that this beam borrowing memory savings assumes variable compression rates conventionally implemented in the art. Consequently, the 2× calculated savings is in addition to the conventional compression techniques.

Accordingly, it is obvious that beam borrowing/deflecting reduces memory requirements by half for substantially equivalent image performance. Furthermore, processing requirements are reduced by half because of the virtual processing of multiple scan lines at once. In principle, beam borrowing delivers character edge quality enhancement equivalent to that obtained by doubling the resolution of the print engine while doubling the page rate and requiring only half as much memory and half of the scanner speed. Although these potential gains may be reduced somewhat by overall system design constraints, there are multiple economic and technical benefits to be derived from the beam borrowing method.

What has been described above are the preferred embodiments for a system and method for enhancing resolution and reducing banding effects in a laser printer. It will be obvious that the present invention is easily implemented utilizing any of a variety of hardware and/or software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A method of deflecting a laser beam in an image transfer device, the method comprising:

(a) detecting indicia of a white space adjacent an edge of an image to be transferred;

(b) deflecting the laser beam from a current scan line on an imaging surface to an offset position on the imaging surface in at least a process direction and at any point in time responsive to the indicia detected, whereby an angle of deflection of the laser beam occurs independent of movement of the imaging surface, and wherein the laser beam is deflected in a scan direction by a scanner and deflected in either one of a forward or reverse scan direction or process direction by at least one deflector; and, (c) pulsing the laser beam at the offset position.

2. The method of claim 1 wherein responsive to detecting the white space, the offset position occurs at the edge of the image for enhancing resolution at the edge.

3. The method of claim 2 wherein the image transfer device has a base dot resolution defined relative to the pulsing of the laser beam, and the offset position at the edge of the image is at a distance of at least one dot over in one of a scan and a process direction, and a distance of a half dot over in the other of the scan and process directions, whereby the resolution is effectively doubled at the edge.

4. The method of claim 1 further including controlling the offset position by manipulating at least three bits of memory.

5. The method of claim 1 wherein the white space is detected by referencing a memory map of the image.

6. The method of claim 1 wherein the variation in movement of the imaging surface is rotational or translational relative to the laser beam.

7. The method of claim 1 further including, after pulsing the laser beam at the offset position, allowing the laser beam to continue along its current scan line for transferring the image.

8. The method of claim 1 wherein the at least one deflector includes an electro-optic modulator.

9. A system for improving performance in an image transfer device having a laser beam and an imaging surface, comprising:
   (a) means for selectively detecting indicia of at least one of:
      (i) a white space adjacent an edge of an image to be transferred; or,
      (ii) a variation in movement of the imaging surface;
   (b) means for deflecting the laser beam from a current scan line on the imaging surface to an offset position on the imaging surface in at least a process direction and at any point in time responsive to the indicia detected, whereby an angle of deflection of the laser beam occurs that is measured independent of movement of the imaging surface, and wherein the laser beam is deflected in a scan direction by a scanner and deflected in either one of a forward or reverse scan direction or process direction by at least one deflector; and,
   (c) means for pulsing the laser beam at the offset position.

10. The system of claim 9 wherein responsive to detecting the white space, the offset position occurs at the edge of the image for enhancing resolution at the edge.

11. The system of claim 10 wherein the image transfer device has a base dot resolution defined relative to the pulsing of the laser beam, and the offset position at the edge of the image, is at a distance of at least one dot over in one of a scan and a process direction, and a distance of a half dot over in the other of the scan and process directions, whereby the resolution is effectively doubled at the edge.

12. The system of claim 9 further including at least three bits of memory for controlling the offset position.

13. The system of claim 9 wherein the means for detecting the white space includes a means for referencing a memory map of the image.

14. The system of claim 9 wherein responsive to detecting the variation in movement of the imaging surface, the offset position is a position which compensates for the variation in movement for reducing banding effects.

15. The system of claim 9 wherein the means for detecting the variation in movement of the imaging surface includes a rotational error detector and a translational error detector.

16. The system of claim 9 wherein the at least one deflector includes an electro-optic modulator.

17. The system of claim 9 further including means for allowing the laser beam to continue along its current scan line after pulsing the laser beam at the offset position for transferring the image.

18. An imaging system, comprising:
   (a) a laser beam and imaging surface;
   (b) means for detecting indicia of a white space adjacent an edge of an image to be transferred;
   (c) means for deflecting the laser beam from a current scan line on the imaging surface to an offset position on the imaging surface in at least a process direction and at any point in time responsive to the indicia detected, whereby an angle of deflection of the laser beam occurs independent of movement of the imaging surface, and wherein the laser beam is deflected in a scan direction by a scanner and deflected in either one of a forward or reverse scan direction or process direction by at least one deflector; and,
   (d) means for pulsing the laser beam at the offset position.

19. The system of claim 18 wherein responsive to detecting the white space, the offset position occurs at the edge of the image for enhancing resolution at the edge.

20. The system of claim 19 wherein the image transfer device has a base dot resolution defined relative to the pulsing of the laser beam, and the offset position at the edge of the image is at a distance of at least one dot over in one of a scan and a process direction, and a distance of a half dot over in the other of the scan and process directions, whereby the resolution is effectively doubled at the edge.

21. The system of claim 18 wherein the means for detecting the white space includes a means for referencing a memory map of the image.

22. The system of claim 18 wherein the at least one deflector includes an electro-optic modulator.

23. The system of claim 18 further including means for allowing the laser beam to continue along its current scan line after pulsing the laser beam at the offset position for transferring the image.

24. A method of operating an image transfer device having a laser beam and an imaging surface, the method comprising:
   (a) detecting indicia of at least one of:
      (i) a white space adjacent an edge of an image to be transferred; or,
      (ii) a variation in movement of the imaging surface;
   (b) deflecting the laser beam from a current scan line on the imaging surface to an offset position on the imaging surface in at least a process direction and at any point in time responsive to the indicia detected, whereby an angle of deflection of the laser beam in the process direction occurs that is measured independent of movement of the imaging surface, and wherein the laser beam is deflected in a scan direction by a scanner and deflected in either one of a forward or reverse scan direction or process direction by at least one deflector; and,
   (c) pulsing the laser beam at the offset position.

25. The method of claim 24 wherein responsive to detecting the white space, the offset position occurs at the edge of the image for enhancing resolution at the edge.

26. The method of claim 24 wherein responsive to detecting the variation in movement of the imaging surface, the offset position compensates for the variation in movement for reducing banding effects.

27. The method of claim 24 wherein the at least one deflector includes an electro-optic modulator.

* * * * *